United States Patent
McCline et al.

(10) Patent No.: US 10,133,746 B1
(45) Date of Patent: *Nov. 20, 2018

(54) PERSISTENT FILE SYSTEM OBJECTS FOR MANAGEMENT OF DATABASES

(71) Applicant: Pivotal Software, Inc., Palo Alto, CA (US)

(72) Inventors: Matthew C. McCline, Palo Alto, CA (US); Milena Bergant, Palo Alto, CA (US)

(73) Assignee: Pivotal Software, Inc., San Francisco, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/162,388

(22) Filed: May 23, 2016

Related U.S. Application Data

(60) Division of application No. 14/194,342, filed on Feb. 28, 2014, now Pat. No. 9,348,831, which is a continuation of application No. 13/107,898, filed on May 14, 2011, now Pat. No. 8,667,033.

(51) Int. Cl.
*G06F 12/00* (2006.01)
*G06F 17/30* (2006.01)

(52) U.S. Cl.
CPC .. *G06F 17/30117* (2013.01); *G06F 17/30607* (2013.01)

(58) Field of Classification Search
None
See application file for complete search history.

(56) References Cited

U.S. PATENT DOCUMENTS

| | | |
|---|---|---|
| 6,259,444 B1 | 7/2001 | Palmer et al. |
| 7,225,204 B2 | 5/2007 | Manley et al. |
| 7,512,755 B2 | 3/2009 | Iwamura et al. |
| 8,667,033 B1 | 3/2014 | McCline et al. |
| 2001/0007108 A1 | 7/2001 | Teich et al. |
| 2004/0158588 A1 | 8/2004 | Pruet |
| 2004/0205152 A1* | 10/2004 | Yasuda ............. G06F 17/30212 709/217 |
| 2004/0216109 A1* | 10/2004 | Bhogi ..................... G06F 9/466 718/101 |
| 2004/0267835 A1 | 12/2004 | Zwilling et al. |
| 2006/0235909 A1* | 10/2006 | Oks ..................... G06F 11/1471 |
| 2007/0112884 A1 | 5/2007 | Perrin et al. |
| 2008/0163175 A1 | 7/2008 | Krauss |
| 2010/0250719 A1* | 9/2010 | Klug ................. G05B 19/0423 709/222 |

(Continued)

*Primary Examiner* — Tuan A Pham
(74) *Attorney, Agent, or Firm* — Fish & Richardson P.C.

(57) ABSTRACT

In a mirrored database system, a careful write of intentions to perform file system actions is recorded in a persistent file system objects table that is flushed to disk prior to the actions being taken. The table durably and accurately records identities of file system objects that were in use by the database to facilitate creation and deletion of physical file directories and files on a database during crash recovery and during mirror resynchronize. In the event of a failure, crash recovery may quickly and easily identify file system objects which need to be cleaned up by reference to the persistent file system objects table. Similarly, resynchronization of the mirror database can be performed quickly by referring to the persistent file system table data to detect changes since the last database checkpoint.

13 Claims, 8 Drawing Sheets

(56) References Cited

U.S. PATENT DOCUMENTS

2010/0257198 A1 10/2010 Cohen et al.
2010/0293222 A1 11/2010 Pope et al.
2011/0145201 A1 6/2011 Holst et al.

* cited by examiner

PERSISTENT FILE SYSTEM OBJECTS FOR MANAGEMENT OF DATABASES

CROSS-REFERENCE TO RELATED APPLICATIONS

This application is a division of U.S. patent application Ser. No. 14/194,342, filed on Feb. 28, 2014, entitled "PERSISTENT FILE SYSTEM OBJECTS FOR MANAGEMENT OF DATABASES", issued on May 24, 2016 as U.S. Pat. No. 9,348,831, which is a continuation of U.S. patent application Ser. No. 13/107,898, filed on May 14, 2011, entitled "PERSISTENT FILE SYSTEM OBJECTS FOR MANAGEMENT OF DATABASES", issued on Mar. 4, 2014 as U.S. Pat. No. 8,667,033. The entire contents of the foregoing applications are hereby incorporated by reference.

BACKGROUND

This invention relates generally to databases for digital data storage and retrieval, and more particularly to the management of physical file system objects such as files and directories created or dropped on mirrored databases.

Enterprises employ database systems comprising mirrored databases as a repository of the enterprise's stored data, and such systems provide architecture to support operational systems such as online transaction processing (OLTP). The databases generally have large sizes, store large volumes of data, and experience high numbers of operations.

Mirrored databases comprise a primary database and a mirror database pair that are synchronized by redundantly writing the same data to both databases for backup and to assure high availability of the data if one of the databases fails (crashes). In the event of a crash, or loss of communications with a database, a mirror resynchronization process is performed by the system to manage the creation and deletion of file directories and file objects on both mirrors that store database data to restore the databases to a synchronized state. Mirror resynchronization will re-create file system objects that may not have been created and attempt to remove objects that were logically dropped while the mirror was down. Additionally, if a crash occurs during a transaction, physical file system objects that may have been created by aborted database transactions and those that may have been dropped by committed database transactions may remain. Mirror resynchronization needs to know which file system objects to clean up on the mirrors that were logically deleted and which file system objects to re-create that were logically created while the mirror was down. Frequently, this information is not readily available.

The file systems used in databases typically do not support external local or distributed transactions, and have no mechanism for accurately and durably recording which file system objects are in use by the database. Moreover, some database systems do have a crash recovery undo so that there is no mechanism to remove physical objects by an aborted transaction during crash recovery. They can only do redo operations during crash recovery by replaying and redoing all work recorded in a transaction log, such as a Write Ahead Log (WAL), since a last database checkpoint. For large databases, this can be a very lengthy process. The database systems generally lose track of file directories and files used by the database when the database crashes, and physical files would be left around with old database data and would occupy disk space without the knowledge of the database, which can hamper performance. With mirrored databases, this situation is exacerbated.

It is desirable to provide systems and methods that address this and other problems of resynchronization of mirrored databases following a database crash by facilitating cleanup of physical file system objects from the databases, and it is to these ends that the present invention is directed.

BRIEF DESCRIPTION OF DRAWINGS

FIG. 9, comprising

DESCRIPTION OF PREFERRED EMBODIMENTS

The invention is particularly well adapted for use with database systems that employ mirrored database pairs comprising a primary database and a mirror database which store the same data, and will be described in that context. As will be appreciated, however, this is illustrative of only one utility of the invention, and the invention may also be used, for example, to manage a non-mirrored database.

Figure 1:
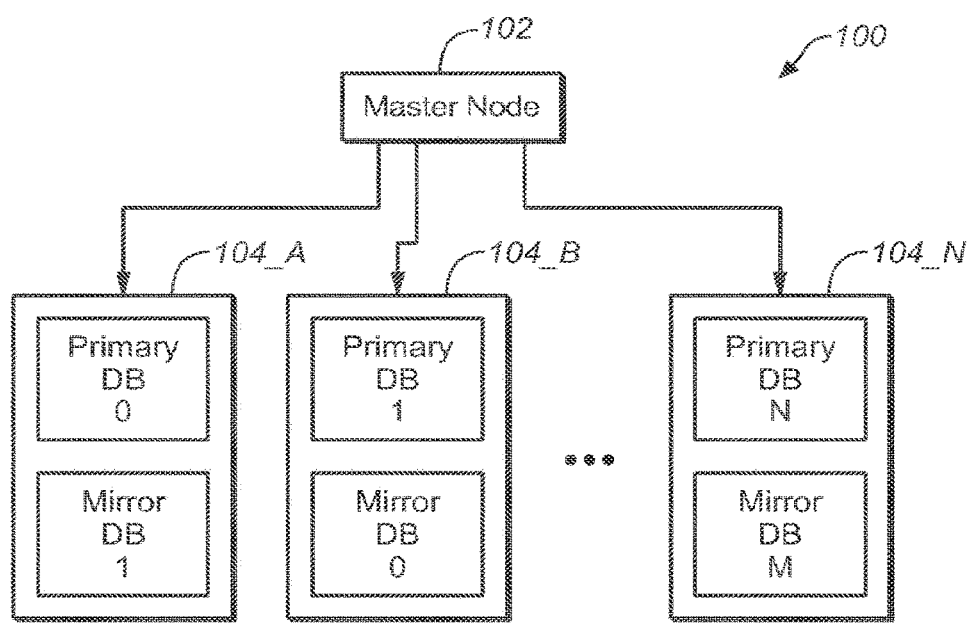
FIG. 1 is a block diagram that illustrates a known network architecture of a logical database cluster in which the invention may be employed.

FIG. 1 illustrates a shared-nothing network architecture of a logical database cluster 100 with which the invention may be employed. The network may include a master node 102 which internally connects to a plurality of shared-nothing nodes 104-A through 104-N. Each node may comprise a plurality of database (DB) segments (database instances) including one or more primary databases and one or more mirror databases. As indicated in the figure, for fault tolerance purposes, a primary database and its corresponding mirror database are located on different nodes. Node 104-A may contain, for example, Primary DB 0 and Mirror DB 1, whereas node 104-B may contain Primary DB 1 and Mirror DB 0. Thus, mirroring Primary DB 0 on node 104-A requires that primary data be written to Mirror DB 0 on node 104-B. Database systems such as illustrated in FIG. 1 may be used as a repository of an enterprise's digital stored data and to provide an architecture for data flow to support operational systems such as online transaction processing (OLTP).

Figure 2:
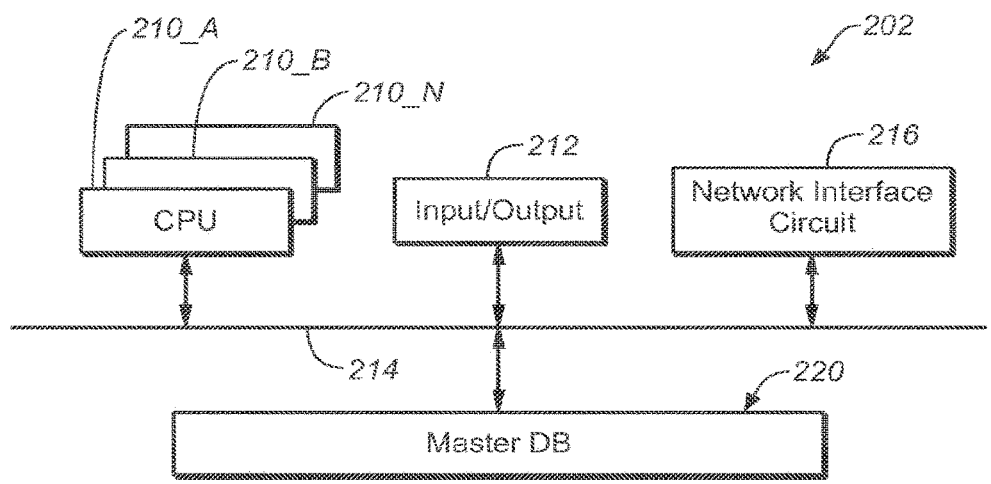
FIG. 2 is a block diagram of a master node of the network of FIG. 1 that may be configured to operate in accordance with an embodiment of the invention.

FIG. 2 illustrates a master node 202 configured to implement operations in accordance with the invention. The method node may comprise a plurality of host CPUs 210-A through 210-N connected to input/output (I/O) Devices 212 by a bus 214. The I/O devices may be primarily disk storage, and may also comprise standard computer system input and output devices. A network interface circuit 216 may also be connected to bus 214 to allow the master node to operate in a networked environment. The master node may also have a memory 220 connected to the bus that embodies executable instructions to control the operation of the host computer system of the node and to perform processes in accordance with the invention. Included in memory 220 is a master database instance to which users connect.

Figure 3:
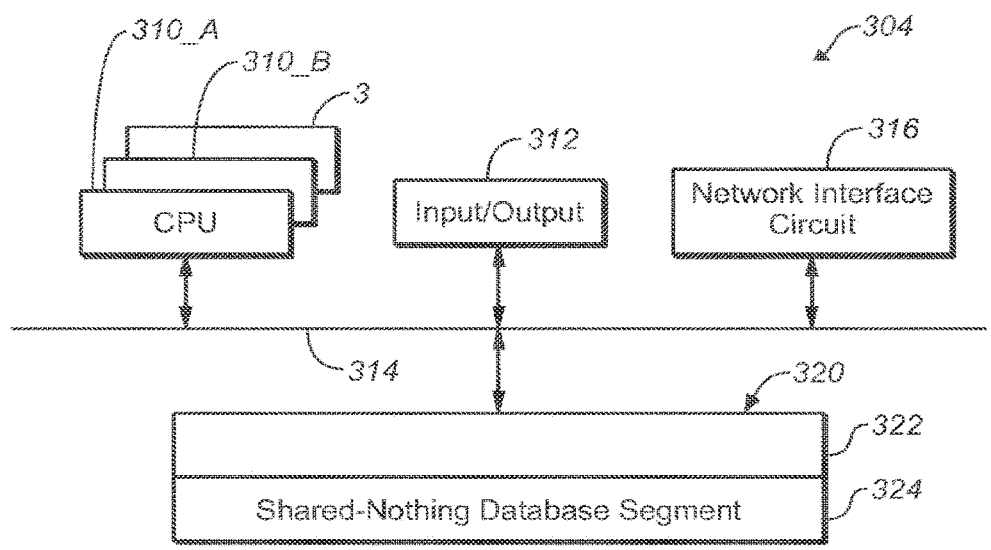
FIG. 3 is a block diagram of a node of the network of FIG. 1 that may be configured to operate in accordance with an embodiment of the invention.

FIG. 3 illustrates a shared-nothing node 304 configured to implement operations in accordance with the invention. Node 304 may have a similar architecture to master node 202, comprising a plurality of host CPUs 310-A through 310-N connected to a bus 314. A set of input/output devices 312, a network interface circuit 316 to afford network connectivity, and a memory 320 may also be connected to the bus. Memory 320 may comprise a first array portion 322 containing data and executable instructions to implement the processes of the invention, and may include one or more shared-nothing database segments 324. The database segments 324 may comprise primary and mirror DB instances.

The invention addresses the problems of managing database physical file directories and file system objects in conjunction with database transactions, crash recovery, and mirror resynchronization by employing a careful-write of intentions process in connection with database transactions to durably and accurately record persistent file system object records to facilitate and manage the creation and deletion of file directories and files on a database. As will be described in more detail, the invention in one embodiment utilizes a persistent file system objects table in which records of intentions to perform file system actions are first written, and the table is flushed to disk before an action is taken. The table may be used to track whether a file system object was or might have been created. If a crash occurs, the crash recovery process may examine the intention records in the table and perform either clean up (delete) or retry of the action depending upon whether the transaction aborted or committed. Similarly, mirror resynchronization may use the intention records to facilitate resynchronization of a mirror database. In one embodiment, there are two intentions to perform file system actions for which such record are maintained. These are create and delete. A create intention remembers a file system object which may have been created during a user transaction that might abort and which will need to be deleted later. A delete intention remembers that a file system object was logically deleted by a transaction and that file system object needs to be reliably and physically removed after the transaction commits.

Figure 4:
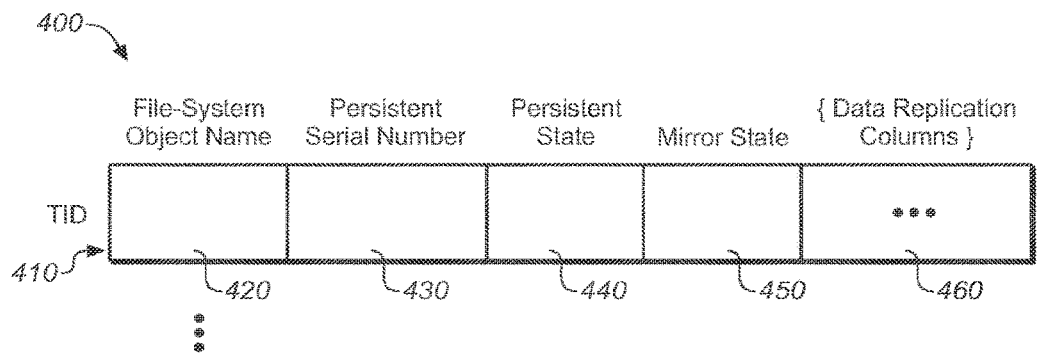
FIG. 4 illustrates an embodiment of a persistent file system object table in accordance with the invention.

FIG. 4 illustrates an embodiment of a persistent file system objects table 400 in accordance with the invention in which intention records may be recorded before file system actions are taken. The table may be organized with a plurality of rows and columns, and each record 410 may comprise a row of the table having fields corresponding to the columns in which relevant information is recorded. One field 420 of the table may contain the file system object name which is the file system name of a file or directory. Another field 430 may contain a persistent serial number that uniquely identifies the record in the table since rows may be recycled. The serial number may be a unique serial number that is used to detect proper use of an entry, i.e. it prevents an old obsolete entry from accidentally being used. The field 440 may record the persistent state of the file system object, and a field 450 records the state of the file system object in the mirror database from the primary database's point of view. The data replication fields 460, which may comprise a plurality of columns, are used to assist mirror resynchronization in catching up the mirrored data in physical database files. A persistent entry record 410 may be addressed by a tuple identifier (TID).

Figure 5:
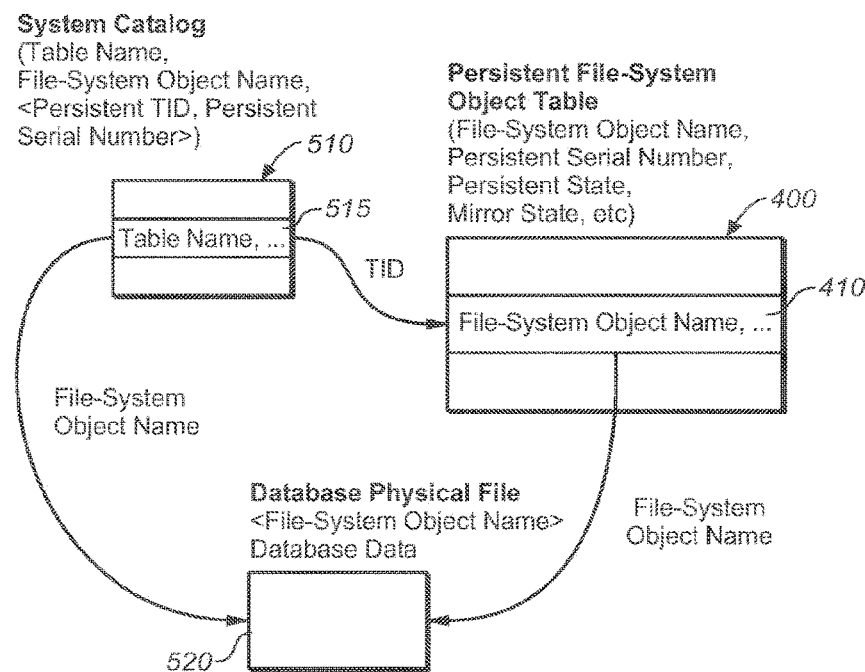
FIG. 5 illustrates the relationship between and the operation of the persistent file system object table of FIG. 4, a system catalog and a database physical file.

FIG. 5 illustrates the relationship between and the cooperation of the persistent file system object table 400 and a system catalog 510 in identifying and referencing a database physical file 520. The system catalog 510 has an entry 515 for each table. The entry may contain the file system object name of the physical database file 520, and a reference <Persistent TID, Persistent Serial Number> to the entry (record) 410 in the persistent file system objects table 400. The file system object name entry in the system catalog and in the persistent file system objects table is used to reference the database physical file 520, as indicated.

Figure 6:
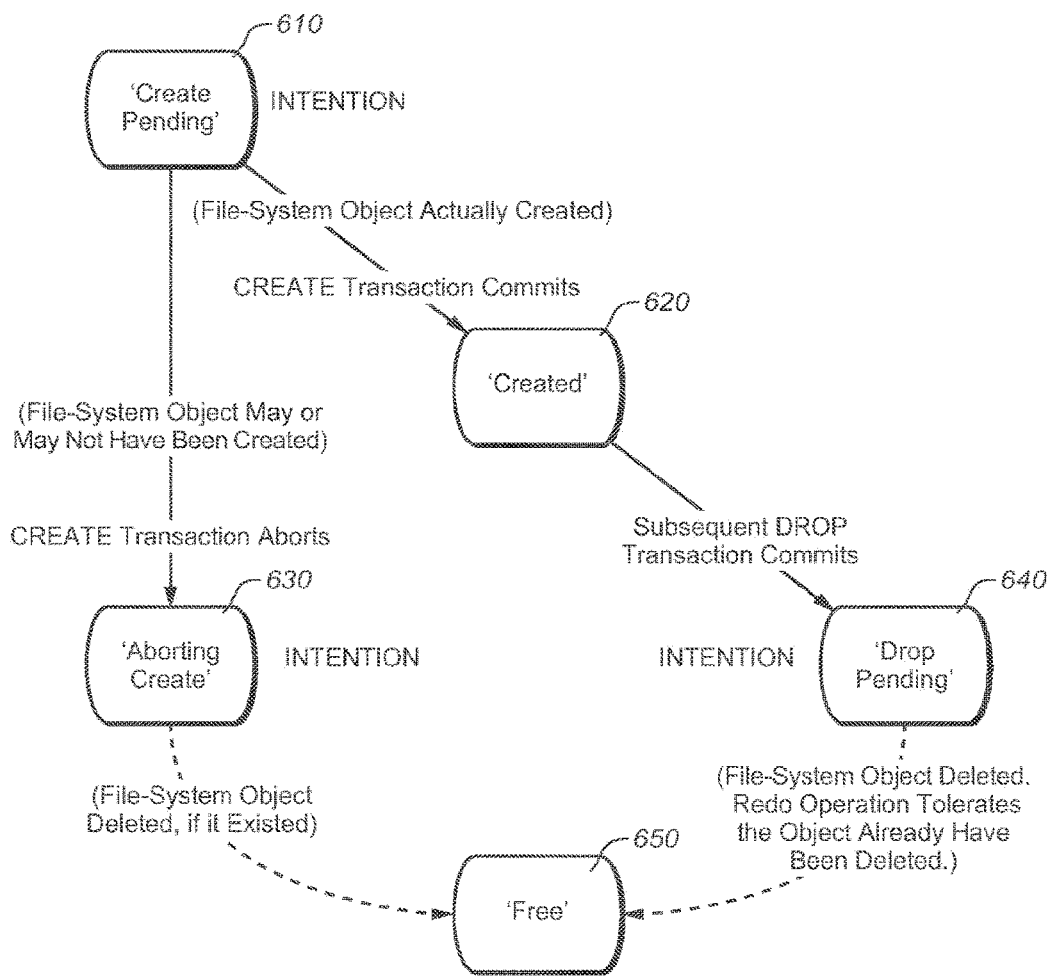
FIG. 6 illustrates a process in accordance with the invention of recording file system action intentions and file system objects states in the persistent file system object table of FIG. 4.

FIG. 6 illustrates a process according to the invention of recording file system action intentions and object states in the persistent file system objects table of FIG. 4. Before a file system object is actually created, an intention record "Create Pending" 610 is added to the persistent file system object table 410 with the persistent state 440 being indicated in the record as "Create Pending". When the file system object is actually created and the create transaction commits, the persistent state in the table is changed to "Created", as indicated at 620. If, on the other hand, the transaction aborts either prior to or after the file system object is created, an intention record 630 having the state "Aborting Create" is written to the table. If, after a transaction commits there is a subsequent drop transaction file system action that commits, an intention record 640 having the state "Drop Pending" is written to the table. Upon the file system object being deleted, if it existed, after either a transaction aborts (630) or a drop transaction commits (640), the persistent state of the file system object may be changed to "Free" at 650.

Figure 7:
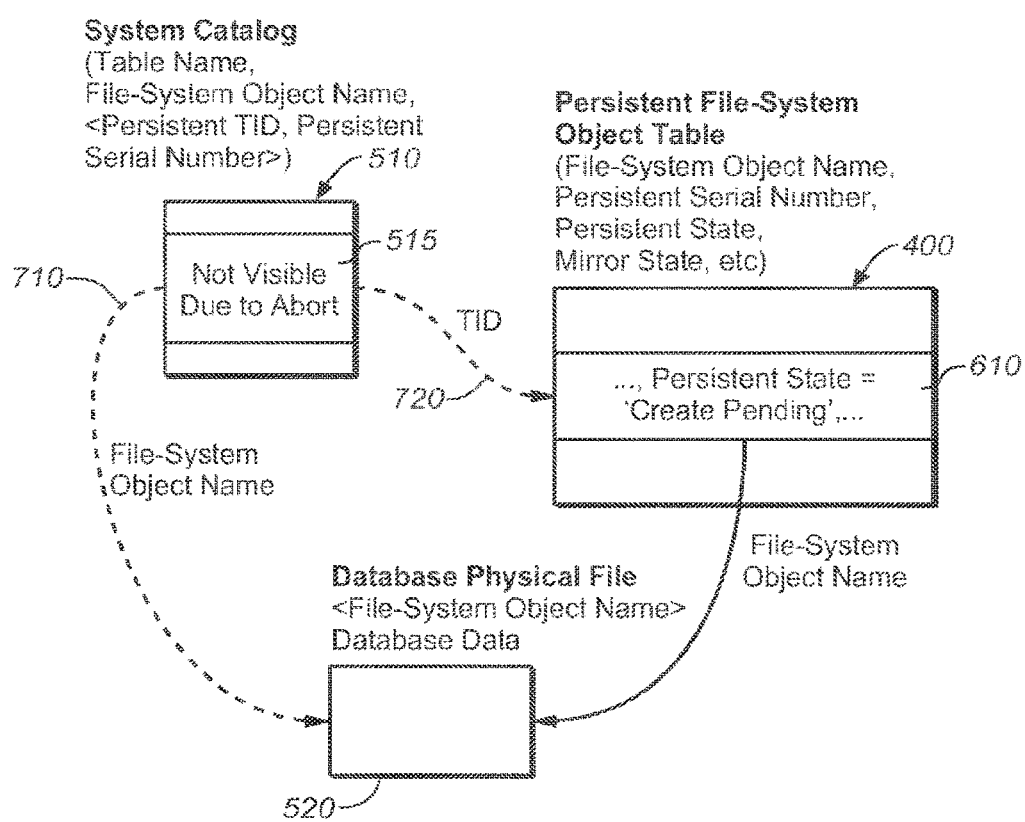
FIG. 7 illustrates an embodiment of a process of the invention in connection with a crash occurring during a create transaction operation.

If the database crashes during a transaction abort, the previously recorded intention record in the persistent file system objects table insures that crash recovery will remove the file system object that was physically created by the aborted transaction. FIG. 7 illustrates the operation of the invention upon a crash and abort occurring during a create transaction. As shown, an intention record 610 having the state "Create Pending" was initially inserted into the persistent file system object table 400 before the create action was started, as previously described, and this record persists. Since the entry 515 in the system catalog 510 will no longer be visible due to the abort, it cannot be used to reference the physical file 520 in either the database or in the persistent file system objects table record, as indicated by the dotted lines 710 and 720 in the figure. However, crash recovery will locate the "Create Pending" entry 610 in the persistent file system objects table and find no corresponding commit transaction record. Thus, crash recovery will know that the physical file 520 must be removed.

Figure 8:
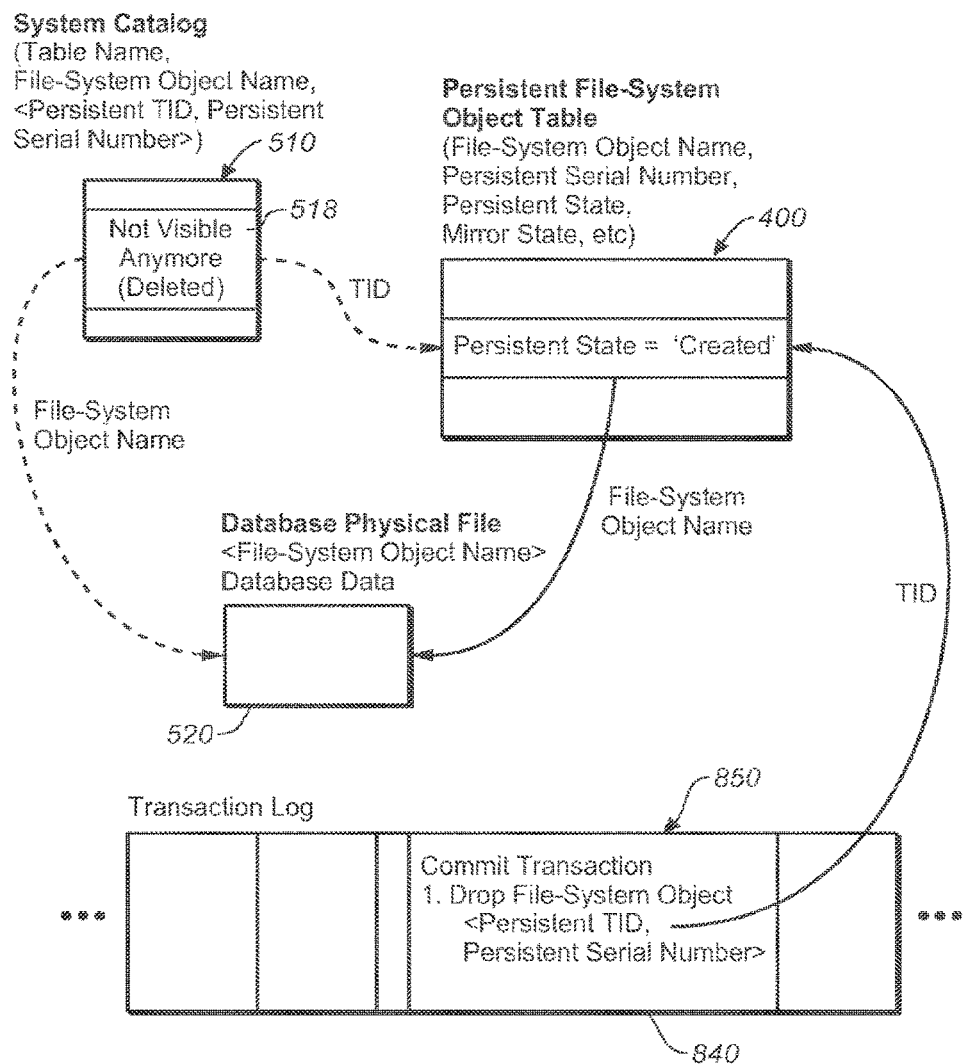
FIG. 8 illustrates an embodiment of a process of the invention in connection with a crash following a drop transaction commit and prior to post-commit operation.

FIG. 8 illustrates the operation of the invention upon a crash occurring after a drop transaction commits but before post-commit operations are performed. As previously described, a record 620 having the state "Created" was initially written into the persistent file system objects table 400, and this record persists when the drop transaction is interrupted by a system crash after the drop transaction commits. Since the entry 518 in the system catalog 510 for the drop transaction is no longer visible because the drop transaction committed, it can no longer be used to reference either the database physical file 520 or the persistent file system objects table 400, as indicated by the dashed lines 810 and 820. Commit will insert a transaction log record 840 "Drop File System Object" into the transaction log 850, for the file system objects that were dropped by the transaction. Entry 840 will contain the reference <Persistent TID, Persistent Serial Number> to the corresponding entry 620 in the persistent file system objects table having state "Created". The record 620 will inform the crash recovery process that the post-transaction work of physically deleting the corresponding file system object database file was not completed, and that it needs to be performed.

Similarly, if a user wishes to delete a file system object that was created in an earlier transaction, the user cannot physically delete the file system object during an active phase of the transaction because the transaction might abort. Also, standard transaction protocols are such that aborted transactions do not affect data. Thus, deletion of the physical file system object must be postponed until post-commit time, at which time the persistent file system objects table record will be updated to "Drop Pending" to durably remember that the file system object needs to be physically removed.

Persistent file system table data is system data that is changed outside of the scope of an actual transaction so that it may be used by the database during post transaction processing to clean up file system objects. If a database crashes, crash recovery can use the information in the persistent file system object able to retry clean up. Record changes are like small buffered writes. If the transaction log (e.g., the Write Ahead Log) with a record change is flushed to disk, the change is durable and will be seen by crash recovery if the database crashes after the flush. Similarly, inserting an intention records into the file system objects table and flushing the transaction log to disk amounts to a durable careful write that preserves the persistent object records for later use.

For a mirror database, additional persistent state records in the persistent file system objects table track whether a file system object has been or might have been created on the mirror. Mirror resynchronize will re-create file system objects that might not have been created on the mirror. If a database object was logically dropped while the mirror was down, a as going down, then mirror resynchronize will find the persistent entry in the persistent file system objects table marked "Only Mirror Drop Remains" that indicates that the file system object must be removed from the mirror.

Figure 9A:
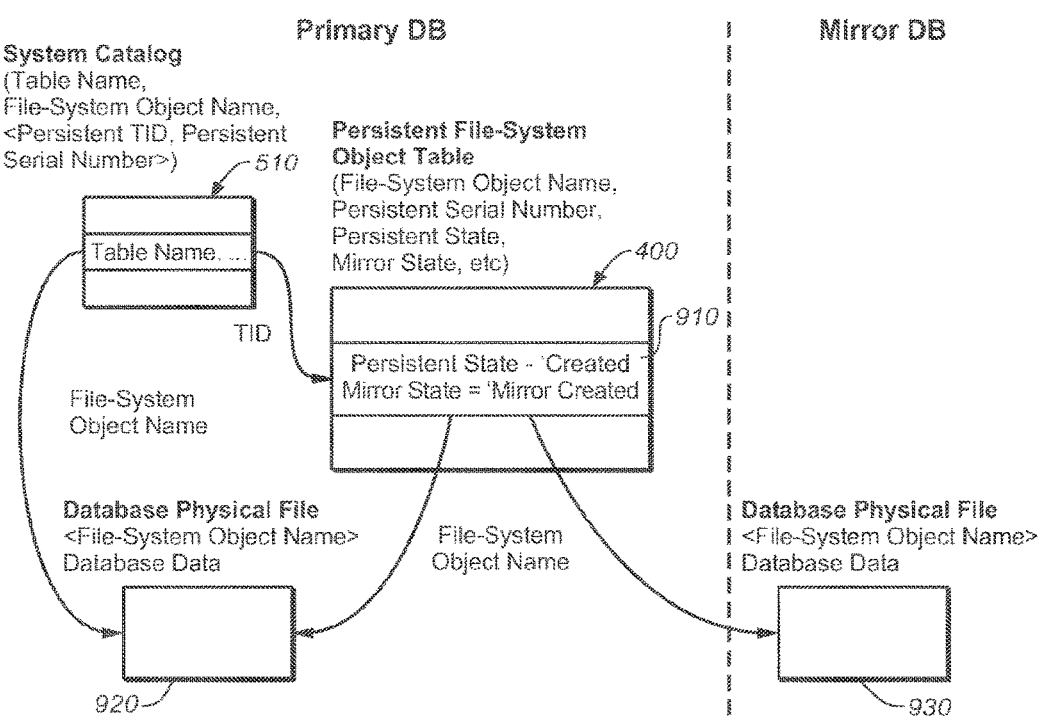
FIGS. 9A and 9B, illustrates examples of processes in accordance with the invention with mirrored databases in connection with a create while mirrored operation and a drop after mirror loss.
Figure 9B:
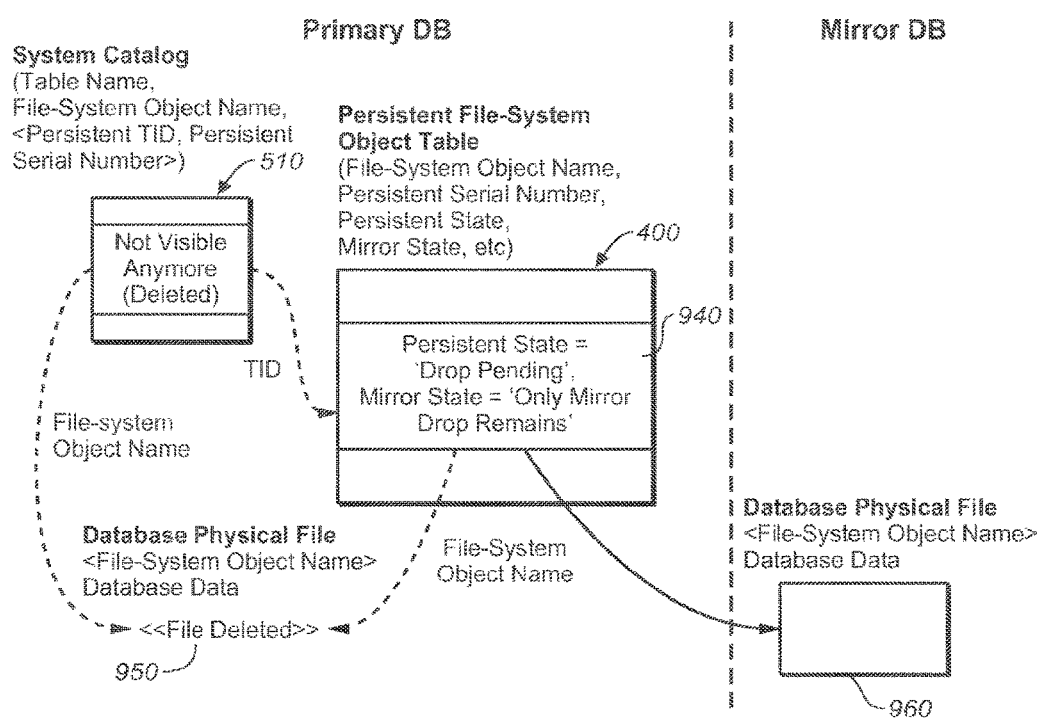

FIG. 9, comprising FIGS. 9A-B, illustrates examples of the operation of an embodiment of the invention for mirrored databases. FIG. 9A illustrates a create while mirrored operation, where a record 910 in the persistent file system objects table 400 identifies a database physical file 920 in the primary database and a corresponding database physical file 930 in the mirror database using the same file system object name as a reference. Since files 920 and 930 were physically created while the databases were mirrored, the entry 910 indicates the persistent state of the primary database in field 440 (FIG. 4) to be "Created" and indicates the mirror state (of the mirror database) in field 450 to be "Mirror Created", as shown. Thus, following a system crash, crash recovery will recognize that these physical files should both be present on the databases in the absence of a subsequent drop transaction and that no cleanup is necessary.

FIG. 9B illustrates a drop after mirror loss. A record entry 940 in the persistent file system objects table 400 indicates a persistent state of "Drop Pending" for the identified file system object of the primary database, which physical file was deleted as indicated at 950. However, since the mirror database was down (or out of communication), the corresponding database physical file 960 in the mirror database could not be deleted. While the mirror database being down does not impede the dropped transaction on the primary database so that file 950 was deleted, the physical file 960 on the mirror database remains and needs to be deleted later during a mirror resynchronize. Accordingly, the persistent state "Drop Pending" for the primary database physical file 950 remains in the entry record 940 in the persistent file system objects table 400, and the mirror state 450 entry in the table indicates "Only Mirror Drop Remains" indicating that the crash recovery process must delete the physical file 960 from the mirror database. Since the primary database file 950 was deleted, the reference in the system catalog 510 to the physical database file 950 and to the persistent file system objects table entry 940 are no longer visible. However, upon inspecting the persistent file system objects table during crash recovery, the entry 940 indicating the persistent state of the primary database file and the mirror database file will be available to the crash recovery process which can use this information to clean up the files.

As may be appreciated from the foregoing, the invention affords accurate ownership of all physical file directories and physical files in a database system that are used to store database data, so that there are no lost or extra file directories and no lost or extra files in the databases. No lost file directories and no lost files means no lost disk space by the database. No extra file directories and no extra files is a major benefit because mirror database verification can quickly and easily identify the file directories and files to compare during crash recovery and mirror resynchronize, and readily determine whether the primary and mirrored databases are synchronized. Furthermore, by providing a durable and accurate careful write of intentions to perform file system actions, the invention dramatically improves the performance of mirrored databases, and dramatically reduces crash recovery times in the event of a failure and the time to resynchronize mirrored databases.

An embodiment of the invention affords a computer storage product comprising a computer readable storage medium storing executable computer instructions for controlling the operations of computer systems to perform the processing operations described herein. The computer readable medium may be any standard media well known and available to those skilled in the art, including, but not limited to magnetic media such as hard disks, floppy disks, magnetic tape; optical media such as CD-ROMs, DVDs, holographic devices; magneto-optical media; and hardware devices configured to store and execute program code, such as application-specific integrated circuits (ASICs), programmable logic devices and ROM and RAM devices.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:
1. A computer-implemented method comprising:
   maintaining, by a database system, a system catalog comprising a reference to a table of persistent state records, wherein a persistent state record in the table of persistent state records includes a status of a database system object that is a physical file of the database system, and wherein the persistent state record includes a reference to the physical file;

receiving, by a drop transaction of the database system, a request to delete the database system object;

determining, as part of a crash recovery process, that one or more post-commit operations for the drop transaction were not performed before the database system was interrupted, including:
  determining, from an entry in a transaction log, that the drop transaction was committed by the database system, wherein the entry in the transaction log identifies the persistent state record of the database system object, and
  determining that the status of the database system object in the persistent state record indicates that the database system object has not been deleted; and in response to determining that the one or more post-commit operations for the drop transaction were not performed before the database system was interrupted, performing one or more of the post-commit operations including deleting the database system object.

2. The method of claim 1, further comprising:
receiving, by a create transaction of a database system, a request to create the database system object;
generating the requested database system object; and
generating the persistent state record having a status indicating that the database system object has been created.

3. The method of claim 1, wherein generating the persistent state record comprises generating the persistent state record before initiating creation of the database system object.

4. The method of claim 1, wherein the persistent state record has status values for the database system object comprising create pending, created, drop pending, and free.

5. The method of claim 1, further comprising:
determining that the database system object has no corresponding entry in a system catalog of the database system.

6. A database system comprising:
one or more processors; and
a non-transitory storage device storing instructions operable to cause the one or more processors to perform operations comprising:
  maintaining, by a database system, a system catalog comprising a reference to a table of persistent state records, wherein a persistent state record in the table of persistent state records includes a status of a database system object that is a physical file of the database system, and wherein the persistent state record includes a reference to the physical file;
  receiving, by a drop transaction of the database system, a request to delete the database system object;
  determining, as part of a crash recovery process, that one or more post-commit operations for the drop transaction were not performed before the database system was interrupted, including:
    determining, from an entry in a transaction log, that the drop transaction was committed by the database system, wherein the entry in the transaction log identifies the persistent state record of the database system object, and
    determining that the status of the database system object in the persistent state record indicates that the database system object has not been deleted; and
  in response to determining that the one or more post-commit operations for the drop transaction were not performed before the database system was interrupted, performing one or more of the post-commit operations including deleting the database system object.

7. The database system of claim 6, the operations further comprising:
receiving, by a create transaction of a database system, a request to create the database system object;
generating the requested database system object; and
generating the persistent state record having a status indicating that the database system object has been created.

8. The database system of claim 6, wherein generating the persistent state record comprises generating the persistent state record before initiating creation of the database system object.

9. The database system of claim 6, wherein the persistent state record has status values for the database system object comprising create pending, created, drop pending, and free.

10. The database system of claim 6, the operations further comprising:
determining that the database system object has no corresponding entry in a system catalog of the database system.

11. A non-transitory storage device storing instructions operable to cause one or more processors to perform operations comprising:
maintaining, by a database system, a system catalog comprising a reference to a table of persistent state records, wherein a persistent state record in the table of persistent state records includes a status of a database system object that is a physical file of the database system, and wherein the persistent state record includes a reference to the physical file;
receiving, by a drop transaction of the database system, a request to delete the database system object;
determining, as part of a crash recovery process, that one or more post-commit operations for the drop transaction were not performed before the database system was interrupted, including:
  determining, from an entry in a transaction log, that the drop transaction was committed by the database system, wherein the entry in the transaction log identifies the persistent state record of the database system object, and
  determining that the status of the database system object in the persistent state record indicates that the database system object has not been deleted; and
in response to determining that that the one or more post-commit operations for the drop transaction were not performed before the database system was interrupted, performing one or more of the post-commit operations including deleting the database system object.

12. The non-transitory storage device of claim 11, the operations further comprising:
receiving, by a create transaction of a database system, a request to create the database system object;
generating the requested database system object; and
generating the persistent state record having a status indicating that the database system object has been created.

13. The non-transitory storage device of claim 11, wherein generating the persistent state record comprises generating the persistent state record before initiating creation of the database system object.

\* \* \* \* \*

UNITED STATES PATENT AND TRADEMARK OFFICE
CERTIFICATE OF CORRECTION

| | |
|---|---|
| PATENT NO. | : 10,133,746 B1 |
| APPLICATION NO. | : 15/162388 |
| DATED | : November 20, 2018 |
| INVENTOR(S) | : Matthew C. McCline and Milena Bergant |

It is certified that error appears in the above-identified patent and that said Letters Patent is hereby corrected as shown below:

In the Claims

Column 8, Line 52, in Claim 11:
Delete "that that"
And insert --that--, therefor.

Signed and Sealed this
Twenty-ninth Day of January, 2019

Andrei Iancu
*Director of the United States Patent and Trademark Office*